(12) United States Patent
Panje et al.

(10) Patent No.: US 9,912,988 B2
(45) Date of Patent: Mar. 6, 2018

(54) PREDICTIVE CONDITIONING OF MULTIMEDIA FOR DEVICE SYNCHRONIZATION

(71) Applicant: ARRIS Enterprises LLC, Suwanee, GA (US)

(72) Inventors: Krishna Prasad Panje, Bangalore (IN); Sadeesh Kumar Karuppiah, Bangalore (IN); Praveen Girish, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/092,131

(22) Filed: Apr. 6, 2016

(65) Prior Publication Data

US 2017/0295401 A1    Oct. 12, 2017

(51) Int. Cl.

| H04N 7/18 | (2006.01) |
|---|---|
| H04N 21/4402 | (2011.01) |
| H04N 21/436 | (2011.01) |
| H04N 21/488 | (2011.01) |
| H04N 21/45 | (2011.01) |
| H04N 21/466 | (2011.01) |

(52) U.S. Cl.
CPC . *H04N 21/44029* (2013.01); *H04N 21/43615* (2013.01); *H04N 21/440218* (2013.01); *H04N 21/4516* (2013.01); *H04N 21/4663* (2013.01); *H04N 21/4882* (2013.01)

(58) Field of Classification Search
CPC ........... H04N 21/4516; H04N 21/6582; H04N 21/44029; H04N 21/43615; H04N 21/440218; H04N 21/4663; H04N 21/4882; H04W 4/02; H04B 17/26
See application file for complete search history.

(56) References Cited

U.S. PATENT DOCUMENTS

| 9,472,239 B1 * | 10/2016 | Martin | G11B 27/105 |
|---|---|---|---|
| 2006/0058052 A1 * | 3/2006 | Plestid | H04W 72/005 |
| | | | 455/519 |
| 2009/0080870 A1 | 3/2009 | Mudie et al. | |
| 2012/0304233 A1 * | 11/2012 | Roberts | H04N 21/23113 |
| | | | 725/82 |
| 2017/0061310 A1 * | 3/2017 | Vahabi | G06N 7/005 |

* cited by examiner

*Primary Examiner* — Oleg Asanbayev
(74) *Attorney, Agent, or Firm* — Bart A. Perkins (57) ABSTRACT

Methods, systems, and computer readable media may be operable to facilitate anticipatory conditioning of multimedia content for delivery to one or more devices. A multimedia device may track and record correlations between each of a plurality of devices, wherein the correlations are based on the order in which one or more devices request synchronization of a piece of content following a request by a first device for synchronization of the same piece of content. The multimedia device may update device correlations with each subsequent content synchronization request. When the multimedia device receives a synchronization request for a piece of content, the multimedia device may identify a device correlated with the requesting device and may initiate a conditioning of the piece of content for delivery to the correlated device without first receiving a request for synchronization of the piece of content from the correlated device.

20 Claims, 5 Drawing Sheets

PREDICTIVE CONDITIONING OF MULTIMEDIA FOR DEVICE SYNCHRONIZATION

TECHNICAL FIELD

This disclosure relates to the predictive conditioning of multimedia for device synchronization.

BACKGROUND

It is commonplace that multimedia content is shared between multiple subscriber devices. For example, a central device such as a gateway device or set-top box may be configured to share multimedia content stored on the device with one or more companion devices including media players and mobile client devices such as a smart phone or tablet. Content that is recorded at a central device may be transcoded to a format that is compatible with one or more client devices, and the transcoded content may be transferred to one or more of the client devices. For example, a client device may be synchronized with a central device, wherein content stored at the central device is transferred to the client device for later consumption by a user.

A user may select content of interest at a central device, and the selected content of interest may be conditioned (e.g., processed or transcoded) according to the playback attributes of a client device designated for receiving the content (e.g., mobile device, tablet, etc.). After the content is conditioned to suit the needs of the client device, the conditioned content may be transferred to the client device. Where both the central device and client device have wireless capabilities, the content may be transferred to the client device over a wireless network. The conditioning processes may be time consuming, depending on the quality and/or length of the content and may be carried out by the central device as background processes over an extended period of time. Moreover, one or more users may wish to condition a piece of content for delivery to a plurality of companion devices, and the content may have to be conditioned differently for each of the plurality of companion devices based on the playback and/or delivery requirements associated with the devices. Therefore, a need exists for methods and systems operable to facilitate an efficient conditioning of content for delivery to a plurality of devices.

BRIEF DESCRIPTION OF THE DRAWINGS

Like reference numbers and designations in the various drawings indicate like elements.

DETAILED DESCRIPTION

It is desirable to provide methods and systems operable to facilitate an efficient conditioning of content for delivery to a plurality of devices. Methods, systems, and computer readable media may be operable to facilitate anticipatory conditioning of multimedia content for delivery to one or more devices. A multimedia device may track and record correlations between each of a plurality of devices, wherein the correlations are based on the order in which one or more devices request synchronization of a piece of content following a request by a first device for synchronization of the same piece of content. The multimedia device may update device correlations with each subsequent content synchronization request. When the multimedia device receives a synchronization request for a piece of content, the multimedia device may identify a device correlated with the requesting device and may initiate a conditioning of the piece of content for delivery to the correlated device without first receiving a request for synchronization of the piece of content from the correlated device.

An embodiment of the invention described herein may include a method comprising: (a) receiving a request to deliver a piece of content to a first device; (b) creating a first conditioned version of the piece of content by conditioning the piece of content according to one or more requirements associated with the first device; (c) receiving a request to deliver the piece of content to a second device; (d) creating a second conditioned version of the piece of content by conditioning the piece of content according to one or more requirements associated with the second device, wherein one or more of the requirements associated with the second device are different from one or more of the requirements associated with the first device; and (e) updating a device correlation metric associated with the first device and the second device, wherein the device correlation metric provides a metric of the probability that a request for a piece of content will be received from the second device after a request for the same piece of content is received from the first device.

According to an embodiment of the invention, conditioning the piece of content comprises transcoding the piece of content to create a conditioned version of the piece of content that may be delivered to and processed for playback by a target client device.

According to an embodiment of the invention, one or more of the requirements associated with the first device and one or more of the requirements associated with the second device comprise formatting requirements associated with content playback at the respective devices.

According to an embodiment of the invention, the device correlation metric associated with the first device and the second device comprises a number of times that a request for a piece of content has been received from the second device after a request for the same piece of content has been received from the first device.

According to an embodiment of the invention, updating a device correlation metric associated with the first device and the second device comprises incrementing the device correlation metric.

According to an embodiment of the invention, the method described herein further comprises ordering a group of device correlation metrics, wherein the group of device correlation metrics comprises the updated device correlation metric associated with the first device and the second device and at least one device correlation metric associated with the first device and a device other than the first device or the second device, and wherein the device correlation metrics of the group of device correlation metrics are ordered based upon the value of each respective device correlation metric.

An embodiment of the invention described herein may include one or more non-transitory computer readable media having instructions operable to cause one or more processors to perform the operations comprising: (a) receiving a request to deliver a piece of content to a first device; (b) creating a first conditioned version of the piece of content by conditioning the piece of content according to one or more requirements associated with the first device; (c) identifying a second device based on a correlation between the first device and the second device; and (d) creating a second conditioned version of the piece of content by conditioning the piece of content according to one or more requirements associated with the second device, wherein one or more of the requirements associated with the second device are different from one or more of the requirements associated with the first device.

According to an embodiment of the invention, conditioning the piece of content comprises transcoding the piece of content to create a conditioned version of the piece of content that may be delivered to and processed for playback by a target client device.

According to an embodiment of the invention, one or more of the requirements associated with the first device and one or more of the requirements associated with the second device comprise formatting requirements associated with content playback at the respective devices.

According to an embodiment of the invention, the correlation between the first device and the second device is identified based upon a correlation metric associated with a pairing of the first device and the second device, the correlation metric comprising a number of times that a request for a piece of content has been received from the second device after a request for the same piece of content has been received from the first device.

According to an embodiment of the invention, creation of the second conditioned version of the piece of content is initiated without first receiving a request for delivery of the piece of content to the second device.

According to an embodiment of the invention, the instructions of the non-transitory computer readable media are further operable to cause the one or more processors to perform the operations comprising outputting a message to a subscriber, wherein the message notifies a user that the second conditioned version of the piece of content is available for delivery to the second device.

According to an embodiment of the invention, the instructions of the non-transitory computer readable media are further operable to cause the one or more processors to perform the operations comprising outputting the second conditioned version of the piece of content to the second device.

An embodiment of the invention described herein may include an apparatus comprising: (a) an interface configured to be used to receive a request to deliver a piece of content to a first device; (b) one or more modules configured to: (i) create a first conditioned version of the piece of content by conditioning the piece of content according to one or more requirements associated with the first device; (ii) identify a second device based on a correlation between the first device and the second device; and (iii) create a second conditioned version of the piece of content by conditioning the piece of content according to one or more requirements associated with the second device, wherein one or more of the requirements associated with the second device are different from one or more of the requirements associated with the first device.

According to an embodiment of the invention, conditioning the piece of content comprises transcoding the piece of content to create a conditioned version of the piece of content that may be delivered to and processed for playback by a target client device.

According to an embodiment of the invention, one or more of the requirements associated with the first device and one or more of the requirements associated with the second device comprise formatting requirements associated with content playback at the respective devices.

According to an embodiment of the invention, the correlation between the first device and the second device is identified based upon a correlation metric associated with a pairing of the first device and the second device, the correlation metric comprising a number of times that a request for a piece of content has been received from the second device after a request for the same piece of content has been received from the first device.

According to an embodiment of the invention, creation of the second conditioned version of the piece of content is initiated without first receiving a request for delivery of the piece of content to the second device.

According to an embodiment of the invention, the apparatus described herein further comprises an output interface configured to be used to output a message to a subscriber, wherein the message notifies a user that the second conditioned version of the piece of content is available for delivery to the second device.

According to an embodiment of the invention, the apparatus described herein further comprises an output interface configured to be used to output the second conditioned version of the piece of content to the second device.

Figure 1:
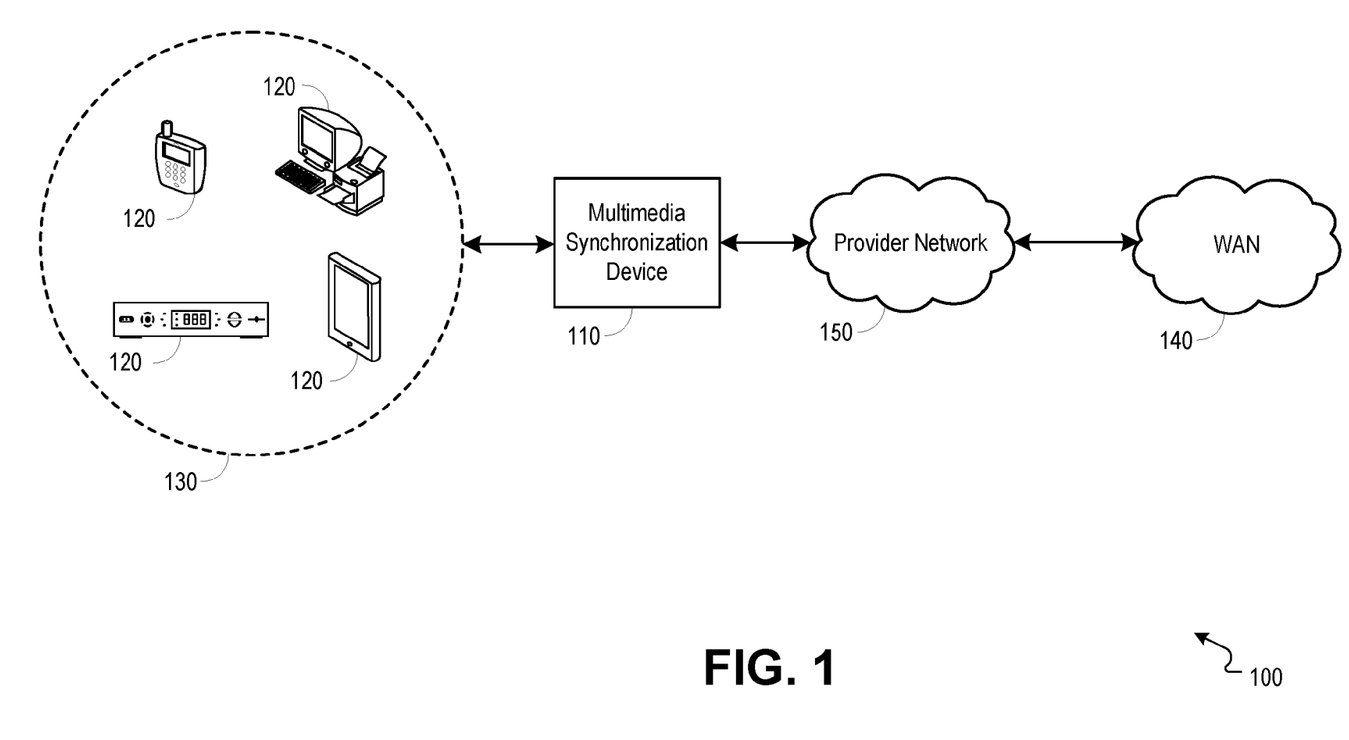
FIG. 1 is a block diagram illustrating an example network environment operable to facilitate anticipatory conditioning of multimedia content for delivery to one or more devices.

FIG. 1 is a block diagram illustrating an example network environment 100 operable to facilitate anticipatory conditioning of multimedia content for delivery to one or more devices. In embodiments, a multimedia synchronization device 110 may be configured to provide multimedia services to one or more client devices 120. The multimedia synchronization device 110 may include a multimedia or residential gateway, a set-top box (STB), or any other device configured to receive, store, and/or deliver multimedia content to one or more client devices 120. Client devices 120 may include televisions, computers, tablets, mobile devices, STBs, game consoles, and any other device configured to receive a multimedia service.

In embodiments, multimedia content may be delivered from a multimedia synchronization device 110 to one or more client devices 120 over a local network 130 (e.g., a local area network (LAN), a wireless local area network (WLAN), a personal area network (PAN), etc.). The multimedia synchronization device 110 may receive services from and may communicate with an upstream wide area network (WAN) 140 through a connection to a provider network 150. It should be understood that the multimedia synchronization device 110 may operate as an access point to wirelessly deliver multimedia content to one or more client devices 120 that are associated with the multimedia synchronization device 110 as stations.

In embodiments, a multimedia synchronization device 110 may communicate with a client device 120 over a wired or a wireless connection. The multimedia synchronization device 110 may provide one or more channels or service sets through which services and communications may be delivered wirelessly to one or more client devices 120. A client device 120 may associate and authenticate with a multimedia synchronization device 110 or associated access point (e.g., wireless router, network extender, etc.), after which communications and services may be delivered from the multimedia synchronization device 110 to the client device 120. It should be understood that various protocols and/or standards (e.g., Wi-Fi, multimedia over coax alliance (MoCA), ZigBee etc.) may be used to deliver communications between a multimedia synchronization device 110 and client device 120.

A multimedia synchronization device 110 may output live or linear content to a client device 120 as the content is received at the multimedia synchronization device 110, or the multimedia synchronization device 110 may store content and output the stored content to a client device 120 at a later time. For example, content may be transcoded and stored at the multimedia synchronization device 110, wherein the content is conditioned or transcoded into a format that is compatible with one or more client devices 120. The multimedia synchronization device 110 may carry out a data transfer or synchronization operation with an associated client device 120, wherein linear or stored content is wirelessly transferred to the client device 120. The multimedia synchronization device 110 may output content to a client device 120 when the content is requested, when the content has been conditioned and made available for delivery, or at a scheduled time.

In embodiments, a single piece of content may be requested from a multimedia synchronization device 110 for synchronization to a plurality of client devices 120, and each of the plurality of client devices 120 may have different transcoding and/or formatting requirements for the conditioning and/or delivery of the content. Therefore, the multimedia synchronization device 110 may prepare a single piece of content multiple times using different transcoding and/or formatting parameters for the conditioning of each version of the content. Conditioning of a content version suitable for delivery to and display at a client device 120 may include transcoding the content to a capability format associated with the client device 120, encrypting (e.g., digital rights management (DRM) encryption) the content to suit the client device 120, and others. Depending on the size of the content and the availability of resources to the multimedia synchronization device 110, the conditioning of each version of the content may be a time-consuming process.

In embodiments, a multimedia synchronization device 110 may learn content synchronization tendencies of a particular subscriber premises or network environment within which the multimedia synchronization device 110 is situated. For example, the multimedia synchronization device 110 may track the order in which content is requested for synchronization to different client devices 120. Each time that a single piece of content is requested for synchronization to a first client device 120 and a request for synchronization to another client device 120 is subsequently made, a correlation between the first client device 120 and the other client device 120 may be created or modified.

A correlation may exist and may be realized between requests for content synchronization that are received from a first client device 120 and requests for content synchronization that are received from a second client device 120. For example, a primary user of the first client device 120 (i.e., mobile device of sibling A residing in a subscriber premise) and a primary user of the second client device 120 (i.e., mobile device of sibling B residing in the subscriber premise) may be interested in the same types of content, thus requests from the first client device 120 and the second client device 120 for synchronization of the same piece of content may become a typical occurrence. In embodiments, a multimedia synchronization device 110 may track and record correlations between client device 120 requests for content synchronization by creating and updating a table that includes a count of the number of times a request for synchronization of a piece of content is received from a first client device 120 subsequent to a request for synchronization of the same piece of content being received by a second client device 120. It should be understood that the table may include a content request correlation count for each possible or actual pairing of client devices 120 within a subscriber premises or network environment, or that is otherwise associated with a multimedia synchronization device 110. The table may include a device pairing for each possible or actual chronological pairing of devices associated with the multimedia synchronization device 110. For example, a chronological pairing may include a leading device (i.e., a client device 120 first requesting synchronization of a piece of content) and a trailing device (i.e., a client device 120 that requests synchronization of a piece of content after a leading or other client device 120 has already requested synchronization of the piece of content).

Table 1 shows an example embodiment for storing a metric that represents correlations between content synchronization requests received from client devices 120 associated with a multimedia synchronization device 110. The example Table 1 provides content synchronization correlation for three devices (i.e., Device X, Device Y, and Device Z). The correlation metric (i.e., "Correlation Count") provides, for each possible pairing of the three devices, a count of the number of times that a request for synchronization of a piece of content has been received by the second device of the pairing following the reception of a request for synchronization of the same piece of content from the first device of the pairing. For example, according to Table 1, reception of a synchronization request for a piece of content from Device Y has followed a reception of a synchronization request for the same piece of content from Device X a total number of five (5) times. When compared to the correlation counts of the other possible device pairings, the correlation count of five (5) for the synchronization request order of Device X followed by Device Y may provide an indication of a strong correlation between content synchronization requests from Device X and Device Y. It should be understood that the metrics stored in the example Table 1 may be updated with each subsequent content synchronization request, and that the device pairings may be ordered from highest correlation count to lowest correlation count, or vice versa.

TABLE 1

| Client Device Synchronization Request Order | Correlation Count |
|---|---|
| Device X followed by Device Y | 5 |
| Device X followed by Device Z | 3 |
| Device Y followed by Device X | 2 |
| Device Y followed by Device Z | 1 |
| Device Z followed by Device Y | 1 |
| Device Z followed by Device X | 0 |

In embodiments, a multimedia synchronization device 110 may anticipate a request for content synchronization being received from a client device 120 based on a content synchronization request received from another client device 120 and a correlation count associated with the two client devices 120. For example, when a synchronization request for a piece of content is received at a multimedia synchronization device 110 from a first client device 120, the multimedia synchronization device 110 may condition the piece of content for delivery to the first client device 120 and may check a correlation table (e.g., a table similar to the example Table 1) for correlation counts associated with the first client device 120 and one or more other client devices 120. If at least one non-zero correlation count exists for a pairing of the first client device 120 and another client device 120, the multimedia synchronization device 110 may identify the client device 120 of the device pairing having the highest correlation count, and may anticipate that a synchronization request for the same piece of content is likely to be received from the identified client device 120. Using the device correlations of Table 1 as an example, when the multimedia synchronization device 110 receives a synchronization request for a piece of content from Device X, the multimedia synchronization device 110 may anticipate the reception of a request for synchronization of the piece of content from Device Y based on the correlation count associated with the device pairing being the highest count relative to the other device pairings in which Device X is the leading device.

After the identification of the client device 120 as a device likely to request synchronization of the piece of content, a determination may be made whether a synchronization request may be anticipated from a next client device 120 based upon the identification of the client device 120 of the first client device 120 pairing having the highest correlation count. For example, the multimedia synchronization device 110 may check the correlation table for pairings of the identified client device 120 with other client devices 120, and if at least one non-zero correlation count exists for a device pairing, the multimedia synchronization device 110 may identify the client device 120 of the pairing with the highest correlation count and may anticipate that a synchronization request for the same piece of content is likely to be received from the identified client device 120. Using the device correlations of Table 1 as an example, after identifying Device Y as the most likely device to request synchronization of the piece of content, the multimedia synchronization device 110 may anticipate the reception of a request for synchronization of the piece of content from Device Z based on the correlation count associated with the device pairing being the next highest count relative to the other device pairings in which Device X is the leading device. In embodiments, the next client device 120 may be the trailing client device 120 within the first client device 120 pairing having the next highest correlation score (e.g., according to Table 1, Device Z is the trailing of the Device X pairing having the next highest correlation score after Device X-Device Y pairing).

In embodiments, a multimedia synchronization device 110 may condition a piece of content for delivery to a client device 120 that has been identified as a device from which a synchronization request for the piece of content is anticipated based upon a reception of a request for synchronization of the piece of content from a device sharing a correlation or certain level of correlation with the client device 120. For example, the multimedia synchronization device 110 may condition content for delivery to the client device 120 without first receiving a request for synchronization of the content from the client device 120. When the multimedia synchronization device 110 receives a request for synchronization of a piece of content from a first device (e.g., a client device 120), the multimedia synchronization device 110 may condition the piece of content to create a version of the content that is suitable for delivery to and processing by the first device. The multimedia synchronization device 110 may then identify a next device (e.g., another client device 120) for which to condition the piece of content, wherein the next device is identified based on a correlation metric providing a sufficient indication that the next device has, at least on occasion, requested synchronization of a piece of content after the first device had requested synchronization of the same piece of content. The multimedia synchronization device 110 may condition the piece of content to create a version of the content that is suitable for delivery to and processing by the first device. The multimedia synchronization device 110 may continue to identify a next device correlated with the previous device for which the piece of content was conditioned for delivery.

In embodiments, when the multimedia synchronization device 110 receives a request for synchronization of a piece of content from a first device (e.g., a client device 120), the multimedia synchronization device 110 may condition the piece of content to create a version of the content that is suitable for delivery to and processing by the first device. The multimedia synchronization device 110 may then identify a next device (e.g., another client device 120) for which to condition the piece of content, wherein the next device is identified based on a correlation metric providing a sufficient indication that the next device has, at least on occasion, requested synchronization of a piece of content after the first device had requested synchronization of the same piece of content. The next device may be a device having the highest correlation count with the first device relative to one or more other devices having a non-zero correlation count with the first device. In embodiments, the multimedia synchronization device 110 may compare the correlation count associated with the next device to a threshold count, and if the correlation count associated with the next device is higher than the threshold count, the multimedia synchronization device 110 may anticipate a request from the next device for synchronization of the piece of content, and the multimedia synchronization device 110 may condition the piece of content for delivery to the next device. The threshold count may be a predetermined number (e.g., certain number of times that the next device has requested synchronization of a piece of content after the first device had requested synchronization of the piece of content) or may be based upon a certain percentage of all counts associated with the first device (e.g., the threshold count may be equivalent to a certain percentage representing the portion of all counts associated with the first device that is made up by the next device).

In embodiments, conditioning of content based on an anticipation of a request for the content may be carried out at the multimedia synchronization device 110 as a background operation. For example, content may be conditioned for a device based on an anticipation of a content request while the multimedia synchronization device 110 is delivering a conditioned version of the piece of content to another device. It should be understood that the multimedia synchronization device 110 may use whatever resources that are available to the synchronization device, and that are not being used for other processes, to condition the piece of content for delivery to an anticipated device. It should be further understood that the multimedia synchronization device 110 may create a plurality of conditioned versions of the content by conditioning the piece of content using different formatting, transcoding, delivery, and/or playback parameters associated with each of a plurality of devices anticipated as being likely to request synchronization of the piece of content.

In embodiments, the multimedia synchronization device 110 may output a notification to a device for which a piece of content has been conditioned. For example, when the multimedia synchronization device 110 has conditioned a piece of content for delivery to a client device 120 based on an identified correlation between the client device 120 and another device that requested synchronization of the content, the multimedia synchronization device 110 may output a notification to the client device 120 that the conditioned piece of content is available for synchronization to the client device 120. The multimedia synchronization device 110 may be configured to automatically begin a wireless or wired delivery of the conditioned content to the client device 120 if the client device 120 is connected to or otherwise associated with the multimedia synchronization device 110 (e.g., if the client device 120 is within a wireless range associated with the multimedia synchronization device 110), or the multimedia synchronization device 110 may be configured to require confirmation from the client device 120 before beginning a delivery of the conditioned content to the client device 120. The notification may provide a subscriber with the option to request delivery of the conditioned content to the client device 120. It should be understood that the notification may include other information such as recommendations of other content or types of content that has been requested for synchronization by one or more devices correlated with the client device 120, an identification of the availability of other content at the multimedia synchronization device 110 that has been conditioned and is suitable for delivery to the client device 120, various details associated with the conditioned piece of content, and others.

Figure 2:
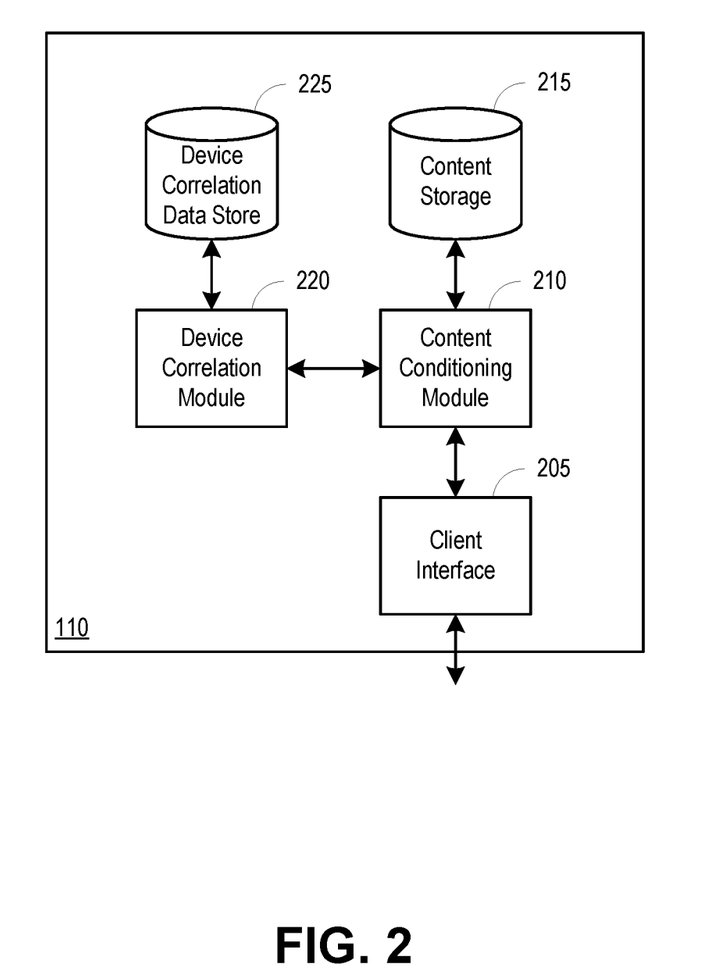
FIG. 2 is a block diagram illustrating an example multimedia synchronization device operable to facilitate anticipatory conditioning of multimedia content for delivery to one or more devices.

FIG. 2 is a block diagram illustrating an example multimedia synchronization device 110 operable to facilitate anticipatory conditioning of multimedia content for delivery to one or more devices. The multimedia synchronization device 110 may include a client interface 205, a content conditioning module 210, content storage 215, a device correlation module 220, and a device correlation data store 225. The multimedia synchronization device 110 may include a multimedia or residential gateway, a set-top box (STB), or any other device configured to receive, store, and/or deliver multimedia content to one or more client devices 120 of FIG. 1.

In embodiments, the multimedia synchronization device 110 may communicate with one or more client devices 120 over a wired or a wireless connection through the client interface 205. The multimedia synchronization device 110 may output content and/or other services to client devices 120 through the client interface 205 and may receive requests for content and/or other upstream communications through the client interface 205. It should be understood that the client interface 205 may include various wired and/or wireless interfaces using various protocols and/or standards (e.g., Wi-Fi, multimedia over coax alliance (MoCA), ZigBee, Ethernet, etc.) and may be used to deliver communications between a multimedia synchronization device 110 and client device 120.

In embodiments, a content conditioning module 210 may condition content for delivery to one or more client devices 120. The content conditioning module 210 may condition live or linear content received at the multimedia synchronization device 110 and/or content that is stored at the content storage 215. For example, the content conditioning module 210 may condition a piece of content to create a conditioned version of the content that is compatible with one or more targeted client devices 120. Conditioning of a content version suitable for delivery to and display at a client device 120 may include transcoding the content to a capability format associated with the client device 120, encrypting (e.g., digital rights management (DRM) encryption) the content to suit the client device 120, and others. The content conditioning module 210 may output conditioned content to a targeted client device 120 through the client interface 205 as a data transfer or synchronization operation. The content conditioning module 210 may output content to a client device 120 when the content is requested, when the content has been conditioned and made available for delivery, or at a scheduled time.

In embodiments, a device correlation module 220 may learn content synchronization tendencies of a particular subscriber premises or network environment within which the multimedia synchronization device 110 is situated. For example, the device correlation module 220 may track the order in which content is requested for synchronization to different client devices 120. Each time that a single piece of content is requested for synchronization to a first client device 120 and a request for synchronization of the piece of content to another client device 120 is subsequently made, the device correlation module 220 may create or modify a correlation between the first client device 120 and the other client device 120. The device correlation module 220 may track and record correlations between client device 120 requests for content synchronization by creating and updating a table (e.g., Table 1) that includes a count of the number of times a request for synchronization of a piece of content is received from a first client device 120 subsequent to a request for synchronization of the same piece of content being received by a second client device 120. The table may include a content request correlation count for each possible or actual pairing of client devices 120 within a subscriber premises or network environment, or that is otherwise associated with the multimedia synchronization device 110. The table may be stored and accessed at a device correlation data store 225.

In embodiments, the device correlation module 220 may anticipate a request for content synchronization being received from a client device 120 based on a content synchronization request that is received at the multimedia synchronization device 110 from another client device 120 and a correlation count associated with the two client devices 120. For example, when a synchronization request for a piece of content is received at a multimedia synchronization device 110 form a first client device 120, the content conditioning module 210 may condition the piece of content for delivery to the first client device 120 and the device correlation module 220 may check a correlation table stored at the device correlation data store 225 for correlation counts associated with the first client device 120 and one or more other client devices 120. If at least one non-zero correlation count exists for a pairing of the first client device 120 and another client device 120, the device correlation module 220 may identify the client device 120 of the device pairing having the highest correlation count, and may anticipate that a synchronization request for the same piece of content is likely to be received from the identified client device 120.

After the identification of a client device 120 as a device likely to request synchronization of the piece of content, the content conditioning module 210 may initiate a conditioning of the piece of content according to formatting, transcoding, delivery, and/or playback requirements associated with the client device 120. It should be understood that the device correlation module 220 may identify a plurality of devices correlated with a requesting client device 120, and conditioned versions of the piece of content may be created for each of the plurality devices in an order that is based on the correlation scores of the pairings between the client device 120 and each of the devices.

In embodiments, the device correlation module 220 may determine whether to condition a piece of content for delivery to a device that is correlated with a requesting client device 120 based upon a comparison of an associated correlation score to a threshold count. For example, if the correlation score associated with a certain pairing of a device and a content-requesting client device 120 is greater than a threshold, the content conditioning module 210 may initiate a conditioning of the piece of content according to formatting, transcoding, delivery, and/or playback requirements associated with the correlated device. The threshold count may be a predetermined number (e.g., certain number of times that a device has requested synchronization of a piece of content after a correlated device had requested synchronization of the piece of content) or may be based upon a certain percentage of all counts associated with a first-requesting device (e.g., the threshold count may be equivalent to a certain percentage representing the portion of all counts associated with the first-requesting device that is made up by the correlated device).

In embodiments, the content conditioning module 210 may output, through the client interface 205, a notification to a device for which a piece of content has been conditioned. For example, when the content conditioning module 210 has conditioned a piece of content for delivery to a client device 120 based on an identified correlation between the client device 120 and another device that requested synchronization of the content, the content conditioning module 210 may output a notification informing the client device 120 that the conditioned piece of content is available for synchronization to the client device 120. The content conditioning module 210 may be configured to automatically begin a wireless or wired delivery of the conditioned content to the client device 120 if the client device 120 is connected to or otherwise associated with the multimedia synchronization device 110 (e.g., if the client device 120 is within a wireless range associated with the multimedia synchronization device 110), or the content conditioning module 210 may be configured to require confirmation from the client device 120 before beginning a delivery of the conditioned content to the client device 120. It should be understood that the notification may include other information such as recommendations of other content or types of content that has been requested for synchronization by one or more devices correlated with the client device 120, an identification of the availability of other content within the content storage 215 that has been conditioned and is suitable for delivery to the client device 120, various details associated with the conditioned piece of content, and others.

Figure 3:
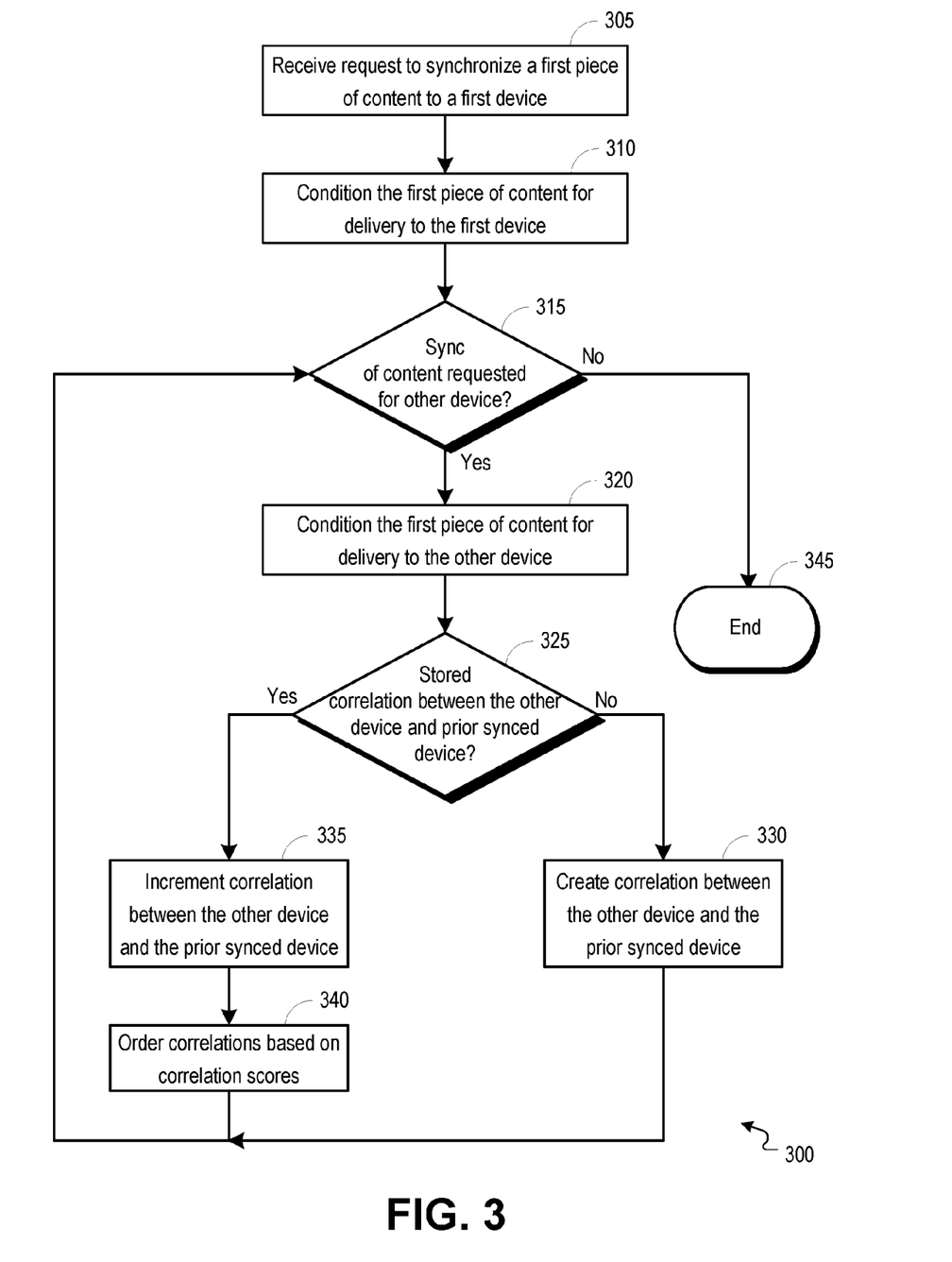
FIG. 3 is a flowchart illustrating an example process operable to facilitate the generation of device synchronization correlation metrics for devices that request synchronization of a common piece of content.

FIG. 3 is a flowchart illustrating an example process 300 operable to facilitate the generation of device synchronization correlation metrics for devices that request synchronization of a common piece of content. The process 300 may begin at 305 when a request to synchronize a first piece of content to a first device is received. In embodiments, the content synchronization request may be received from a client device 120 of FIG. 1 at a multimedia synchronization device 110 of FIG. 1. The first piece of content may be a piece of content that is stored at the multimedia synchronization device 110 (e.g., at content storage 215 of FIG. 2) or at another storage device, a piece of content that is currently being received by the multimedia synchronization device 110 (e.g., live television, streaming content, etc.) or may be a piece of content that is scheduled for delivery to the multimedia synchronization device 110 at a future time.

At 310, the first piece of content may be conditioned for delivery to the first device. The first piece of content may be conditioned for delivery by a content conditioning module 210 of FIG. 2. In embodiments, the content conditioning module 210 may condition the first piece of content according to one or more formatting, playback, and/or delivery requirements associated with the first device, thereby creating a conditioned version of the first piece of content that is suitable for delivery to the first device. Conditioning of the first piece of content may include transcoding the content to a capability format associated with the first device, encrypting (e.g., digital rights management (DRM) encryption) the first piece of content to suit the first device, and others.

At 315, a determination may be made whether a request is made for synchronization of the first piece of content to another device. In embodiments, the multimedia synchronization device 110 may monitor requests received for synchronization of content to one or more devices (e.g., client devices 120 of FIG. 1). If, after receiving a request for synchronization of the first piece of content to a first device or subsequent device, the multimedia synchronization device 110 receives a request for synchronization of the first piece of content to another device, the multimedia synchronization device 110 may determine that a correlation between the requesting device and a device previously requesting the content (e.g., the first device) should be created or modified.

If, at 315, the determination is made that a request for synchronization of the first piece of content to another device is received, the process 300 may proceed to 320. At 320, the first piece of content may be conditioned for delivery to the other device. The first piece of content may be conditioned for delivery by a content conditioning module 210 of FIG. 2. In embodiments, the content conditioning module 210 may condition the first piece of content according to one or more formatting, playback, and/or delivery requirements associated with the other device, thereby creating a conditioned version of the first piece of content that is suitable for delivery to the other device.

At 325, a determination may be made whether a correlation exists between the other device and the device previously requesting synchronization of the first piece of content. The device previously requesting synchronization of the first piece of content may be the device that requested synchronization of the first piece of content immediately prior to the reception of the request for synchronization of the first piece of content to the other device. The determination whether a correlation exists between the two devices may be made, for example, by a device correlation module 220 of FIG. 2. In embodiments, the device correlation module 220 may search for an existing correlation between the two devices within a stored table (e.g., table stored at a device correlation data store 225 of FIG. 2). For example, a correlation metric (i.e., correlation count) may be maintained at the device correlation data store 225 for each possible or actual chronological pairing of devices that have or that may request content from the multimedia synchronization device 110. If a correlation metric is found for a matching chronological pairing (i.e., a correlation metric for a request for synchronization of a piece of content to the device previously requesting content synchronization followed by a request for synchronization of the same piece of content to the other device) of the two devices, then the determination may be made that a correlation exists between the two devices. If a correlation metric is not found for a matching chronological pairing of the two devices, then the determination may be made that a correlation does not exist between the two devices.

If, at 325, the determination is made that a correlation does not exist between the device previously requesting synchronization of the first piece of content and the other device, the process 300 may proceed to 330. At 330, a correlation between the prior synchronized device (e.g., the device previously requesting synchronization of the first piece of content) and the other device may be created. The correlation between the devices may be created, for example, by the device correlation module 220 of FIG. 2, and the correlation may be stored, for example, at the device correlation data store 225 of FIG. 2. In embodiments, the device correlation module 220 may create the correlation between the two devices by adding the appropriate chronological paring of the two devices (e.g., a table input for a request for synchronization of a piece of content to the device previously requesting content synchronization followed by a request for synchronization of the same piece of content to the other device) to a table and creating an initial value for an associated correlation metric. For example, the device correlation module 220 may create an initial correlation count of one (1) for the chronological paring of the two devices as stored within the device correlation data store 225. After creation of the correlation metric, the multimedia synchronization device 110 may continue to monitor content synchronization requests for synchronization requests of the first piece of content to another device at 315.

If, at 325, the determination is made that a correlation does exist between the device previously requesting synchronization of the first piece of content and the other device, the process 300 may proceed to 335. At 335, a correlation metric associated with the correlation between the other device and the prior synchronized device (e.g., the device previously requesting synchronization of the first piece of content) may be incremented. The correlation metric may be incremented, for example, by the device correlation module 220 of FIG. 2. In embodiments, the device correlation module 220 may identify the appropriate device pairing within a table stored at device correlation data store 225 of FIG. 2 and may increment a correlation count associated with the device pairing.

At 340, one or more device correlations may be re-ordered in light of the incremented correlation metric associated with the chronological pairing of the other device and the prior synchronized device. The one or more device correlations (e.g., chronological device pairings and associated correlation metrics) may be re-ordered, for example, by the device correlation module 220 of FIG. 2. In embodiments, the device correlation module 220 may re-order device correlations stored within a list at a device correlation data store 225 of FIG. 2 such that device correlations of each trailing device (e.g., the device requesting content synchronization after the first or a prior device requests synchronization of the piece of content) associated with a prior device are ordered within the list from highest correlation count to lowest correlation count. After re-ordering the device correlations, the multimedia synchronization device 110 may continue to monitor content synchronization requests for synchronization requests of the first piece of content to another device at 315. It should be understood that in some instances, the list of device correlations may not need to be updated after the incrementing of a correlation count.

Returning to 315, if the determination is made that a request for synchronization of the first piece of content to another device is not received, the process 300 may end at 345. For example, the multimedia synchronization device 110 may monitor content synchronization requests for a certain period of time (e.g., predetermined period of time, a duration for which the content is stored at the multimedia synchronization device 110 or at other storage, and others) before determining that no subsequent requests for synchronization of the first piece of content are received from another device.

Figure 4:
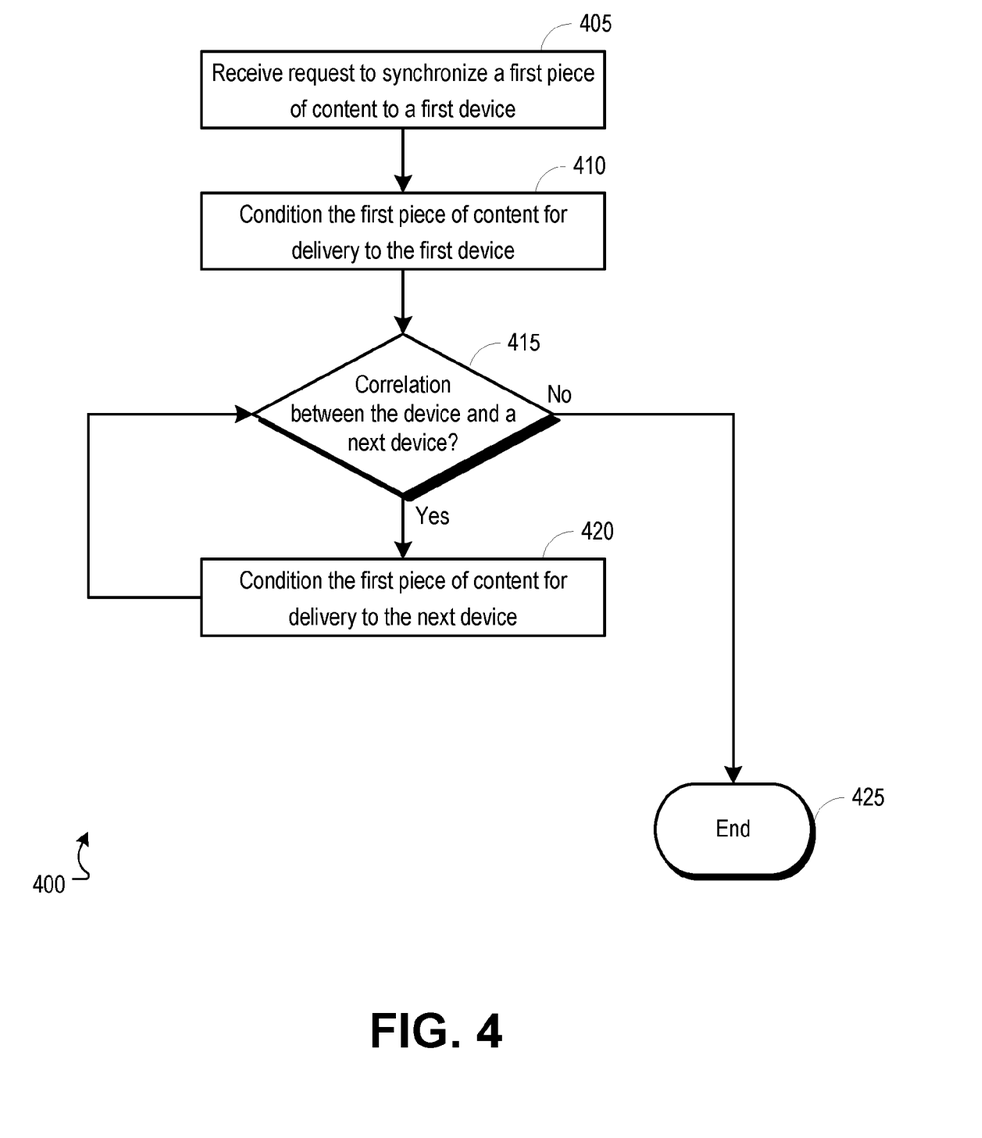
FIG. 4 is a flowchart illustrating an example process operable to facilitate anticipatory conditioning of multimedia content for delivery to one or more devices.

FIG. 4 is a flowchart illustrating an example process 400 operable to facilitate anticipatory conditioning of multimedia content for delivery to one or more devices. The process 400 may begin at 405 when a request to synchronize a first piece of content to a first device is received. In embodiments, the content synchronization request may be received from a client device 120 of FIG. 1 at a multimedia synchronization device 110 of FIG. 1. The first piece of content may be a piece of content that is stored at the multimedia synchronization device 110 (e.g., at content storage 215 of FIG. 2) or at another storage device, a piece of content that is currently being received by the multimedia synchronization device 110 (e.g., live television, streaming content, etc.) or may be a piece of content that is scheduled for delivery to the multimedia synchronization device 110 at a future time.

At 410, the first piece of content may be conditioned for delivery to the first device. The first piece of content may be conditioned for delivery by a content conditioning module 210 of FIG. 2. In embodiments, the content conditioning module 210 may condition the first piece of content according to one or more formatting, playback, and/or delivery requirements associated with the first device, thereby creating a conditioned version of the first piece of content that is suitable for delivery to the first device. Conditioning of the first piece of content may include transcoding the content to a capability format associated with the first device, encrypting (e.g., digital rights management (DRM) encryption) the first piece of content to suit the first device, and others.

At 415, a determination may be made whether a correlation exists between the first device and a next device. The determination whether a correlation exists between the first device and a next device may be made, for example, by a device correlation module 220 of FIG. 2. In embodiments, the device correlation module 220 may search for a correlation metric between the first device and a next device. For example, the device correlation module 220 may search a table (e.g., device correlation table stored at a device correlation data store 225 of FIG. 2) for a correlation pairing of the first device with another device. If more than one other device is found to be correlated with the first device, the device correlation module 220 may identify the other device within the correlation pairing having the highest correlation score as the next device.

If, at 415, the determination is made that a correlation exists between the first device and the next device, the process 400 may proceed to 420. At 420, the first piece of content may be conditioned for delivery to the identified next device, wherein the content is conditioned without first receiving a request for the content from the identified next device. The first piece of content may be conditioned for delivery by a content conditioning module 210 of FIG. 2. In embodiments, the content conditioning module 210 may condition the first piece of content according to one or more formatting, playback, and/or delivery requirements associated with the identified next device, thereby creating a conditioned version of the first piece of content that is suitable for delivery to the identified next device. After conditioning the first piece of content, the device correlation module 220 may search for another device correlated with the first device and/or a device correlated with the identified next device at 415.

Returning to 415, if the determination is made that no correlation exists between the first device (or a next identified device) and another device, the process 400 may end at 425. It should be understood that multiple devices may be correlated with and identified as next devices that are correlated with the first device and/or any subsequently identified next device.

Figure 5:
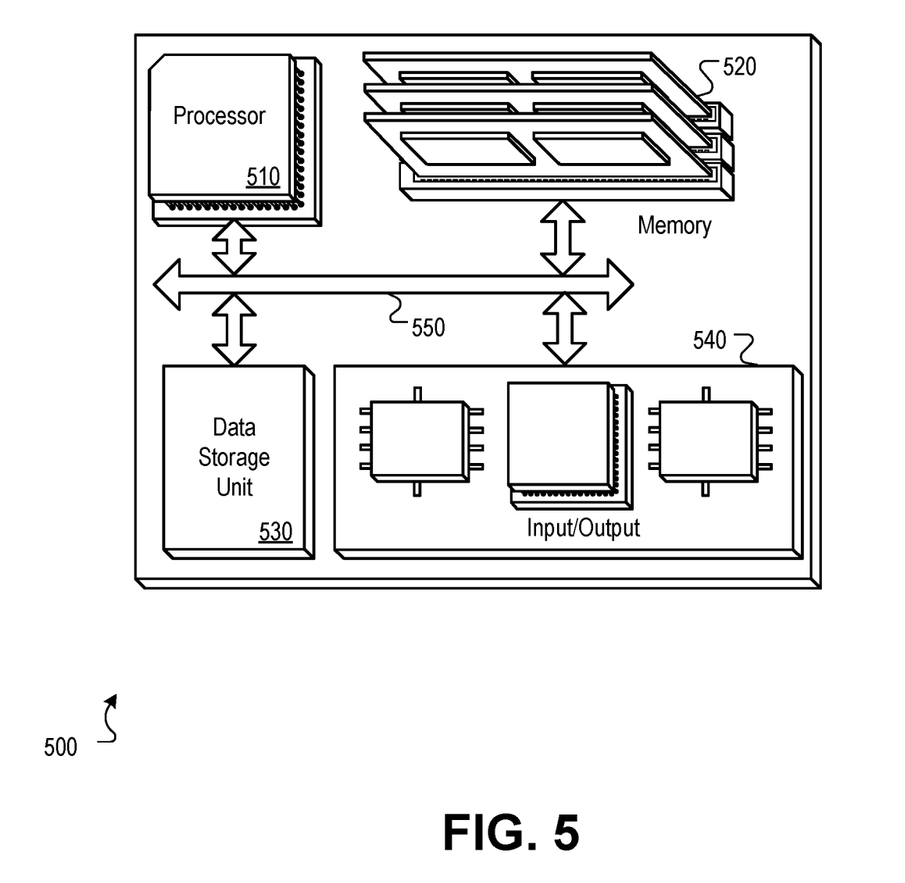
FIG. 5 is a block diagram of a hardware configuration operable to facilitate anticipatory conditioning of multimedia content for delivery to one or more devices.

FIG. 5 is a block diagram of a hardware configuration 500 operable to facilitate anticipatory conditioning of multimedia content for delivery to one or more devices. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a central or access device (e.g., multimedia synchronization device 110 of FIG. 1 such as an access point, gateway device, STB, cable modem, router, wireless extender, or other access device) or client device 120 of FIG. 1 (e.g., STB, computer, television, tablet, mobile device, etc.). In another implementation, the input/output device can include driver devices configured to send communications to, and receive communications from one or more networks (e.g., WAN 140 of FIG. 1, local network 130 of FIG. 1, provider network 150 of FIG. 1, etc.).

Those skilled in the art will appreciate that the invention described herein improves upon methods and systems for the conditioning of content for delivery to a plurality of devices. Methods, systems, and computer readable media may be operable to facilitate anticipatory conditioning of multimedia content for delivery to one or more devices. A multimedia device may track and record correlations between each of a plurality of devices, wherein the correlations are based on the order in which one or more devices request synchronization of a piece of content following a request by a first device for synchronization of the same piece of content. The multimedia device may update device correlations with each subsequent content synchronization request. When the multimedia device receives a synchronization request for a piece of content, the multimedia device may identify a device correlated with the requesting device and may initiate a conditioning of the piece of content for delivery to the correlated device without first receiving a request for synchronization of the piece of content from the correlated device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
receiving a request to deliver a piece of content to a first device;
creating a first conditioned version of the piece of content by conditioning the piece of content according to one or more requirements associated with the first device;
after receiving the request to deliver the piece of content to the first device, receiving a request to deliver the piece of content to a second device;
creating a second conditioned version of the piece of content by conditioning the piece of content according to one or more requirements associated with the second device, wherein one or more of the requirements associated with the second device are different from one or more of the requirements associated with the first device; and
based upon the request to deliver the piece of content to the second device being received after the request to deliver the piece of content to the first device, updating a device correlation metric associated with the first device and the second device, wherein the device correlation metric provides an indication of a correlation between the first device and the second device by providing a metric of the probability that a request for a piece of content will be received from the second device after a request for the same piece of content is received from the first device, and wherein the device correlation metric is utilized in a determination of whether to automatically condition a subsequently requested piece of content for delivery to the second device in response to a request for delivery of the subsequently requested piece of content to the first device.

2. The method of claim 1, wherein conditioning the piece of content comprises transcoding the piece of content to create a conditioned version of the piece of content that may be delivered to and processed for playback by a target client device.

3. The method of claim 1, wherein one or more of the requirements associated with the first device and one or more of the requirements associated with the second device comprise formatting requirements associated with content playback at the respective devices.

4. The method of claim 1, wherein the device correlation metric associated with the first device and the second device comprises a number of times that a request for a piece of content has been received from the second device after a request for the same piece of content has been received from the first device.

5. The method of claim 1, wherein updating a device correlation metric associated with the first device and the second device comprises incrementing the device correlation metric.

6. The method of claim 1, further comprising:
ordering a group of device correlation metrics, wherein the group of device correlation metrics comprises the updated device correlation metric associated with the first device and the second device and at least one device correlation metric associated with the first device and a device other than the first device or the second device, and wherein the device correlation metrics of the group of device correlation metrics are ordered based upon the value of each respective device correlation metric.

7. One or more non-transitory computer readable media having instructions operable to cause one or more processors to perform the operations comprising:
receiving a request to deliver a piece of content to a first device;
creating a first conditioned version of the piece of content by conditioning the piece of content according to one or more requirements associated with the first device;
identifying a second device based on a correlation between the first device and the second device, wherein the correlation is recognized through a device correlation metric associated with the first device and the second device, wherein the device correlation metric provides an indication of a correlation between the first device and the second device by providing a metric of the probability that a request for a piece of content will be received from the second device after a request for the same piece of content is received from the first device; and
creating a second conditioned version of the piece of content by conditioning the piece of content according to one or more requirements associated with the second device, wherein one or more of the requirements associated with the second device are different from one or more of the requirements associated with the first device.

8. The one or more non-transitory computer-readable media of claim 7, wherein conditioning the piece of content comprises transcoding the piece of content to create a conditioned version of the piece of content that may be delivered to and processed for playback by a target client device.

9. The one or more non-transitory computer-readable media of claim 7, wherein one or more of the requirements associated with the first device and one or more of the requirements associated with the second device comprise formatting requirements associated with content playback at the respective devices.

10. The one or more non-transitory computer-readable media of claim 7, wherein the correlation between the first device and the second device is identified based upon a correlation metric associated with a pairing of the first device and the second device, the correlation metric comprising a number of times that a request for a piece of content has been received from the second device after a request for the same piece of content has been received from the first device.

11. The one or more non-transitory computer-readable media of claim 7, wherein creation of the second conditioned version of the piece of content is initiated without first receiving a request for delivery of the piece of content to the second device.

12. The one or more non-transitory computer-readable media of claim 7, wherein the instructions are further operable to cause one or more processors to perform the operations comprising:
   outputting a message to a subscriber, wherein the message notifies a user that the second conditioned version of the piece of content is available for delivery to the second device.

13. The one or more non-transitory computer-readable media of claim 7, wherein the instructions are further operable to cause one or more processors to perform the operations comprising:
   outputting the second conditioned version of the piece of content to the second device.

14. An apparatus comprising:
   an interface that receives a request to deliver a piece of content to a first device;
   one or more modules that:
   creates a first conditioned version of the piece of content by conditioning the piece of content according to one or more requirements associated with the first device;
   identifies a second device based on a correlation between the first device and the second device, wherein the correlation is recognized through a device correlation metric associated with the first device and the second device, wherein the device correlation metric provides an indication of a correlation between the first device and the second device by providing a metric of the probability that a request for a piece of content will be received from the second device after a request for the same piece of content is received from the first device; and
   creates a second conditioned version of the piece of content by conditioning the piece of content according to one or more requirements associated with the second device, wherein one or more of the requirements associated with the second device are different from one or more of the requirements associated with the first device.

15. The apparatus of claim 14, wherein conditioning the piece of content comprises transcoding the piece of content to create a conditioned version of the piece of content that may be delivered to and processed for playback by a target client device.

16. The apparatus of claim 14, wherein one or more of the requirements associated with the first device and one or more of the requirements associated with the second device comprise formatting requirements associated with content playback at the respective devices.

17. The apparatus of claim 14, wherein the correlation between the first device and the second device is identified based upon a correlation metric associated with a pairing of the first device and the second device, the correlation metric comprising a number of times that a request for a piece of content has been received from the second device after a request for the same piece of content has been received from the first device.

18. The apparatus of claim 14, wherein creation of the second conditioned version of the piece of content is initiated without first receiving a request for delivery of the piece of content to the second device.

19. The apparatus of claim 14, further comprising:
   an output interface that outputs a message to a subscriber, wherein the message notifies a user that the second conditioned version of the piece of content is available for delivery to the second device.

20. The apparatus of claim 14, further comprising:
   an output interface that outputs the second conditioned version of the piece of content to the second device.

* * * * *